(12) United States Patent
Toro

(10) Patent No.: US 8,839,553 B2
(45) Date of Patent: Sep. 23, 2014

(54) BENCH AND PLANTER COMBINATION

(75) Inventor: Joseph Toro, Port Jefferson Station, NY (US)

(73) Assignee: AZEK Building Products, Inc., Scranton, PA (US)

( * ) Notice: Subject to any disclaimer, the term of this patent is extended or adjusted under 35 U.S.C. 154(b) by 288 days.

(21) Appl. No.: 13/347,024

(22) Filed: Jan. 10, 2012

(65) Prior Publication Data

US 2012/0174481 A1 Jul. 12, 2012

Related U.S. Application Data

(60) Provisional application No. 61/431,611, filed on Jan. 11, 2011.

(51) Int. Cl.
*A47G 7/00* (2006.01)
*A01G 9/02* (2006.01)

(52) U.S. Cl.
CPC .............. *A01G 9/02* (2013.01); *Y10S 220/908* (2013.01)
USPC ................... 47/39; 47/66.1; 47/86; 220/4.28; 220/4.33; 220/23.87; 220/908

(58) Field of Classification Search
USPC ............ 47/66.1, 86, 68, 39, 85, 87; 220/4.33, 220/4.28, 23.87, 908.1, 908
See application file for complete search history.

(56) References Cited

U.S. PATENT DOCUMENTS

| | | | |
|---|---|---|---|
| 114,638 A * | 5/1871 | Booher | ........................... 47/66.1 |
| 3,241,885 A | 3/1966 | Deaton | |
| D231,587 S | 5/1974 | Herrera | |
| 4,955,499 A | 9/1990 | Petty | |
| D337,439 S | 7/1993 | Scott, Jr. et al. | |
| D355,774 S | 2/1995 | Proserpio | |
| 6,655,083 B2 | 12/2003 | Reed | |
| 6,681,522 B2 * | 1/2004 | Marchioro | ...................... 47/65.5 |
| 7,424,787 B2 | 9/2008 | Singer | |
| RE44,055 E * | 3/2013 | Singer et al. | ................... 47/66.1 |
| 8,424,258 B2 * | 4/2013 | Modica et al. | ............... 52/285.4 |
| 2002/0174600 A1 * | 11/2002 | Reed | .............................. 47/66.1 |
| 2005/0204621 A1 | 9/2005 | Garrison | |

(Continued)

OTHER PUBLICATIONS

Northern Tool & Equipment Web Page "Cedar Bench with Side Planters—Natural Cedar, Model# CSN-CPB-07" (http://www.northerntool.com/shop/tools/product_200466619_200466619?cm_mmc=Aggregates-_-Nextag-_-Outdoors>Picnic Tables + Lawn Furniture-_-122595).

(Continued)

*Primary Examiner* — Rob Swiatek
*Assistant Examiner* — Morgan T Barlow
(74) *Attorney, Agent, or Firm* — Buchanan Ingersoll & Rooney PC

(57) ABSTRACT

A kit for a planter is disclosed that has a polygon shape and has a selected number of sides and a same selected number of corners. The kit includes a selected number of bottom corner brackets, a selected number of corner beads, a selected number of top corner brackets, a selected number of top frame corner brackets, and a selected number of pairs of spacer runners that each correspond to the selected number of corners. The kit also includes a planter tub sized to fit within a planter body. The brackets and spacer runners are configured to be connected together to form a skeleton to which boards can be attached to form the planter body.

20 Claims, 12 Drawing Sheets

(56) References Cited

U.S. PATENT DOCUMENTS

| | | | |
|---|---|---|---|
| 2008/0092442 A1* | 4/2008 | Singer | 47/66.1 |
| 2009/0077881 A1* | 3/2009 | Singer et al. | 47/70 |
| 2009/0218341 A1* | 9/2009 | Wu | 220/4.28 |
| 2011/0247267 A1* | 10/2011 | Lutzke | 47/65.7 |

OTHER PUBLICATIONS

Northern Tool & Equipment Web Page "2×4 Basics AnySize Bench/Chair Kit—Sand, Model# 90134" (http://www.northerntool.com/shop/tools/product_200307917_200307917).

* cited by examiner

BENCH AND PLANTER COMBINATION

CROSS REFERENCE TO RELATED APPLICATION

This application claims the benefit of provisional application Ser. No. 61/431,611, filed Jan. 11, 2011.

BACKGROUND OF THE INVENTION

1. Field of the Invention

The present invention relates to improvements in outdoor furniture. More particularly the invention relates to easy to an assemble bench that is formed in combination with a set of planters.

2. Description of the Related Art

Many homes as well as restaurants and some commercial buildings have outdoor decks. Chairs, tables, benches and other outdoor furniture are placed on decks. Planters are also commonly found on decks.

Composite materials such as extruded plastic with and without fillers have become popular for decking boards and other outdoor structures because they can be formed in a variety of shapes and sizes and have lower maintenance and simpler installation at a lower cost than wood. Composite materials are nearly impervious to moisture and therefore will not rot or decay like natural wood. During their manufacture, composite materials can be tinted with dyes or other materials to provide a specific color to a component, thus removing the need for surface preparation and painting prior to or subsequent to construction or assembly.

Owners of decks may have the builder make cabinets when they build the deck so that the cabinets match the deck. It is also known to make wooden benches and planters to match the deck. It is easy to match cabinets, planters and benches to a deck when all of the structures are painted or stained. However, when dyed composite materials are used there can be some variations in color among lots of material. Therefore, it is desirable to build the deck as well as cabinets, planters and benches from the same lot of material.

There are a number of kits available for making a bench. These kits may contain frame elements to which lengths of boards are attached by screws or other fasteners. Some kits also contain the boards which are to be attached to the frame.

It is also known to provide a bench with side planters, one planter at each end at the bench. These products can be made of wood or plastic. They may be sold as an integral unit or the planters and bench may be sold as separate components to be assembled by the purchaser. However, these products usually will not closely match a deck in terms of either color or texture.

Consequently, there is a need for a bench with side planters that is made from the same boards as the deck. Preferably a kit is provided which contains the elements that form the frame or skeleton to which cut pieces of deck boards are attached. Therefore, the bench and planters can be made at the same time and from the same lot of decking boards as the deck on which they will be used.

SUMMARY OF THE INVENTION

A kit for a bench and planter combination is disclosed herein that has a planter that has a polygon shape and a selected number of sides and a same selected number of corners. The kit requires a selected number of bottom corner brackets corresponding to the selected number of corners, a selected number of top corner brackets corresponding to the selected number of corners, a selected number of top frame corner brackets corresponding to the selected number of corners, a selected number of corner beads corresponding to the selected number of corners, and a selected number of pairs of spacer runners corresponding to the selected number of corners.

Additionally, the bottom corner brackets and the top corner brackets are each configured to receive an end of each of a pair of boards that forms the corner. The corner beads are each configured to receive a pair of adjacent boards and the top frame corner brackets are each configured to receive an end of each of a plurality of boards. Each of the pairs of spacer runners is configured to receive opposing ends of each of a plurality of boards. The bottom corner brackets, corner beads, top corner brackets, top frame corner brackets, and spacer runners are configured to be connected together to form a skeleton to which boards can be attached to form a first planter body. The kit also requires a planter tub sized to fit within the first planter body.

In a preferred embodiment the kit requires that the selected number of sides of the planter is three, four, five, six, seven, eight, nine, or ten.

In another preferred embodiment the kit requires that each of the top frame corner brackets comprises a two tiered structure such that the top frame corner brackets are configured to receive an end of each of two pairs of boards, one pair of boards above and adjacent to the other.

In a further preferred embodiment the kit requires that each of the top corner brackets comprise a tub holding structure such that the tub holding structure supports a lip of the planter tub and engages a corner of the planter tub.

In still another preferred embodiment the kit requires that the bottom corner brackets comprise a base structure such that the base structure engages one corner bead and a pair of boards engaged with that corner bead.

In still a further preferred embodiment the kit requires that the bottom corner brackets, the top corner brackets, and the top frame corner brackets are each a casting such that the casting is formed from metal, plastic, or fiberglass.

In yet a further preferred embodiment the kit requires that the bottom corner brackets and the top corner brackets each comprise a first portion and a second portion, and wherein the first portion or the second portion is a casting, and wherein each of the top frame corner brackets comprise a first portion, a second portion, and a third portion, and wherein the first portion, the second portion, or the third portion of each of the top frame corner brackets is a casting.

In still another preferred embodiment the kit requires the bottom corner brackets, the top corner brackets, and the top frame corner brackets each comprise a first portion and a second portion, wherein the first portion is formed by sheet metal and the second portion is formed by a casting and wherein the top frame corner brackets each comprise a first portion, a second portion, and a third portion, and wherein the first portion of each of the top frame corner brackets is formed by sheet metal and at least one of the second portion and the third portion of each of the top frame corner brackets is formed by a casting.

In another preferred embodiment the kit requires that the bottom corner brackets, the top corner brackets, and the top frame corner brackets each comprise at least one cover portion being sized and configured such that a cut end of a board that is placed adjacent to the at least one cover portion is hidden from outward view by the at least one cover portion.

In a further preferred embodiment the kit requires that the at least one cover portion is formed from a casting.

In still a further preferred embodiment the kit requires that each of the corner beads is an extrusion.

In yet another preferred embodiment the kit further requires a second selected number of bottom corner brackets corresponding to a second selected number of corners, a second selected number of corner beads corresponding to the second selected number of corners, a second selected number of top corner brackets corresponding to the second selected number of corners, a second elected number of top frame corner brackets corresponding to the selected number of corners, and a second selected number of pairs of spacer runners corresponding to the selected number of corners.

The second selected number of bottom corner brackets and the second selected number of top corner brackets are each configured to receive an end of each of a pair of boards. Each of the second selected number of corner beads is configured to receive a pair of adjacent boards and the second elected number of top frame corner brackets configured to receive an end of each of a plurality of boards. Additionally, the second selected number of pairs of spacer runners configured to receive an end of each of a plurality of boards. The kit also requires a second planter tub sized to fit within the second planter body.

Further, the second selected number of bottom corner brackets, second selected number of corner beads, second selected number of top corner brackets, second selected number of top frame corner brackets, and second selected number of pairs of spacer runners are each configured to be connected together to form a second skeleton to which boards can be attached to form the second planter body.

In yet a further preferred embodiment the kit further requires a pair of end plates, a pair of front corner bead supports, and at least one a pair of mounting brackets that are sized and configured to attach to the first planter body and the second planter body. The front corner bead supports attach to the end plates to form a first bench substructure that has two ends and the end plates are configured to engage the at least one pair of mounting brackets when the at least one pair of mounting brackets are attached to the first planter body and the second planter body such that the first bench substructure is supported on one end by the first planter body and on the other end by the second planter body.

In still a further preferred embodiment the kit further requires at least one pair of corner braces and a bench center bracket such that each of the at least one pair of corner braces is attached at one end of each of the front corner bead supports and is also attached to the end plate that is attached to those ends of the front corner bead supports.

In another preferred embodiment the kit requires that the pair of front corner bead supports are each an aluminum extrusion.

In yet another preferred embodiment the kit further requires that the front corner bead supports comprise a longitudinal ridge such that the longitudinal ridge of each corner bead support supports an end of a plurality of boards that are laid side by side.

In a further preferred embodiment the kit requires that the pair of front corner bead supports has an outside surface that has a cavity defined therein such that a board may fit longitudinally within the cavity.

In still a further preferred embodiment the kit requires that the at least one pair of mounting brackets comprises a pair of mounting brackets and one of the pair of mounting brackets is attached to the first planter body and the other mounting bracket is attached to the second planter body.

In yet further preferred embodiment the kit requires that the end plates comprise at least one notch and the at least one notch is configured to slideably engage the at least one pair of mounting brackets when the at least one pair of mounting brackets are attached to the first planter body and the second planter body.

In another preferred embodiment the kit further requires a third selected number of bottom corner brackets corresponding to the selected number of corners, a third selected number of corner beads corresponding to the selected number of corners, a third selected number of top corner brackets corresponding to the selected number of corners, a third selected number of top frame corner brackets corresponding to the selected number of corners, and a third selected number of pairs of spacer runners corresponding to the selected number of corners.

The third selected number of bottom corner brackets and the third selected number of top corner brackets are each configured to receive an end of each of a pair of boards. Each of the third selected number of corner beads is configured to receive a pair of adjacent boards and each of the third selected number of top frame corner brackets is configured to receive an end of each of a plurality of boards. Each of the third selected number of pairs of spacer runners is configured to receive opposing ends of each of a plurality of boards. The kit also requires a second planter tub sized to fit within a third planter body.

Further the third selected number of bottom corner brackets, corner beads, top corner brackets, top frame corner brackets, and pairs of spacer runners are configured to be connected together to form a skeleton to which boards can be attached to form the third planter body;

In addition, the kit requires a second pair of end plates, a second pair of front corner bead supports, at least one second pair of mounting brackets that are sized and configured to attach to the second planter body and the third planter body. Each one of the second pair of front corner bead supports attaches to each of the second pair end plates to form a second bench substructure that has two ends. Additionally, each of the second pair of end plates are configured to engage the at least one second pair of mounting brackets when the at least one second pair of mounting brackets are attached to the second planter body and the third planter body such that the second bench substructure is supported on one end by the second planter body and on the other end by the third planter body.

Other details, objects, and advantages of the invention will become apparent as the following description of certain present preferred embodiments thereof proceeds.

BRIEF DESCRIPTION OF THE FIGURES

In the accompanying drawing I have shown certain present preferred embodiments of our bench and planter combination in which.

DESCRIPTION OF THE PREFERRED EMBODIMENTS

Figure 1:
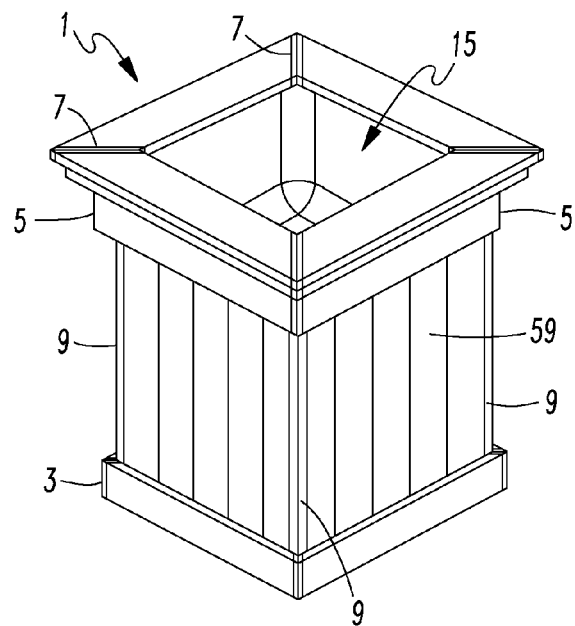
FIG. 1 is a front perspective view of a present preferred embodiment of a planter body of our bench and planter combination.

Our bench and planter combination has a planter body that is made up of a series of brackets and other support components. The brackets and support components may be provided as a kit. The kit for a bench and planter combination has brackets and support components to form a planter 1 that has a polygon shape and a selected number of sides and a same selected number of corners.

Referring to FIGS. 1-22, the kit includes a selected number of bottom corner brackets 3, a selected number of top corner brackets 5, a selected number of top frame corner brackets 7, a selected number of corner beads 9, and a selected number of pairs of spacer runners 11. The number of brackets and pairs of spacer runners that are selected corresponds to the selected number of corners of the planter 1.

Additionally, the bottom corner brackets 3 and the top corner brackets 5 are each configured to receive an end of each of a pair of boards. The corner beads 9 are each configured to receive a pair of adjacent boards and the top frame corner brackets 7 are each configured to receive an end of each of a plurality of boards. Each of the pairs of spacer runners 11 is configured to receive opposing ends of each of a plurality of boards. The bottom corner brackets 3, corner beads 9, top corner brackets 5, top frame corner brackets 7, and spacer runners 11 are configured to be connected together to form a skeleton to which boards can be attached to form a planter body 13. The kit may also include a planter tub 15 sized to fit within the planter body 13.

Figure 22:
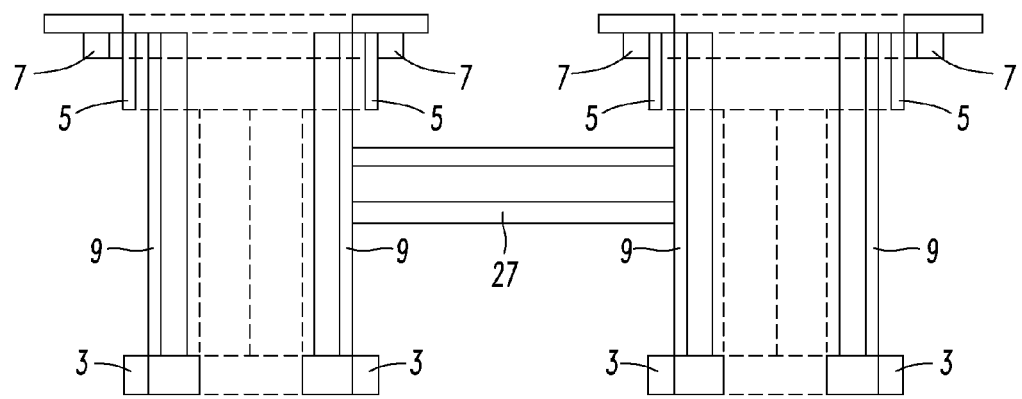
FIG. 22 is a side view of the embodiment of our bench and planter combination shown in FIG. 21 with the boards shown in dotted line and the bench substructure brackets shown in solid line.

FIG. 22 shows a detailed view of an assembled bench and planter combination that has been constructed using the above described brackets and components. The bottom corner brackets 3, corner beads 9, top corner brackets 5, top frame corner brackets 7, and spacer runners 11 are all shown in solid line to illustrate the skeleton that is formed by these components, whereas boards that are used in the construction of the bench and planter combination are shown in dotted line.

In preferred embodiments, the kit may be provided such that the selected number of sides of the planter is three, four, five, six, seven, eight, nine, or ten corresponding to a triangle, a quadrilateral, a pentagon, a hexagon, a heptagon, an octagon, a nonagon, and a decagon. The length of the sides need not be equal in any of these shapes. Varying the length of the sides may require one or more components of the kit to be of different sizes. For example, in a given kit a first pair of spacer runners may be able to hold a certain number of boards whereas a second pair of spacer runners in that same kit may be able to hold a larger or smaller number of boards. One of ordinary skill would understand that a number of shapes and geometric figures with heights and sides of varying lengths are possible.

In a preferred embodiment illustrated in FIGS. 13-17, the top frame corner brackets 7 comprise a two tiered structure such that the top frame corner brackets are configured to receive an end of each of two pairs of boards, one pair of boards above and adjacent to the other. Additionally, in a preferred embodiment illustrated in FIGS. 8-12, the top corner brackets 5 comprise a tub holding structure 17 such that the tub holding structure 17 supports a lip of the planter tub and engages a corner of the planter tub when the planter tub is installed within the planter body.

Further, in a preferred embodiment illustrated in FIGS. 3-7, the bottom corner brackets 3 comprise a base structure 19 such that the base structure 19 engages one corner bead and a pair of boards that are engaged with that corner bead. The base structure 19 of the bottom corner bracket 3 generally matches the angle at which the corner bead 9 would hold an adjacent pair of boards.

Figure 3:
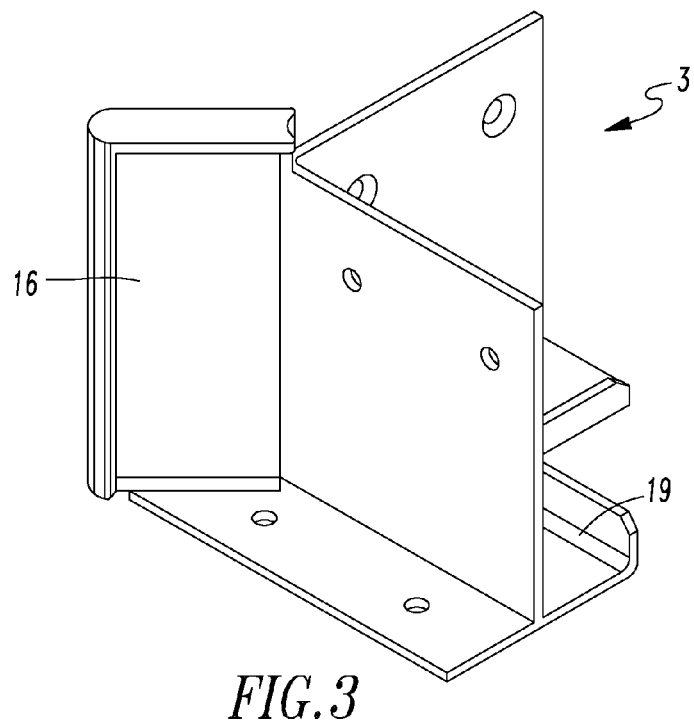
FIG. 3 is a front perspective view of a present preferred embodiment of a bottom corner bracket of our bench and planter combination.
Figure 7:
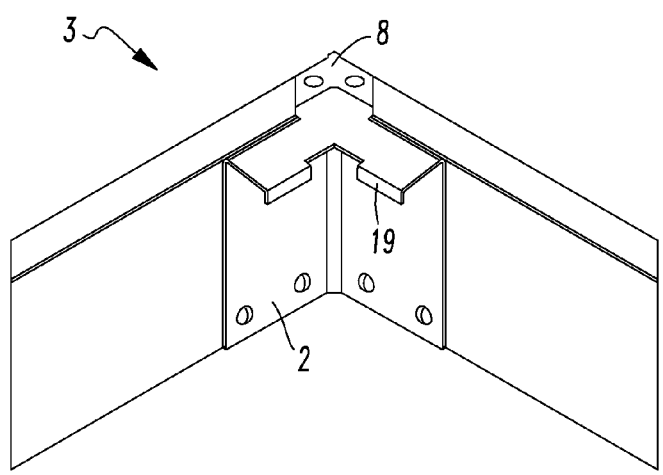
FIG. 7 is a perspective view of the assembled bottom corner bracket shown in FIG. 6.
Figure 8:
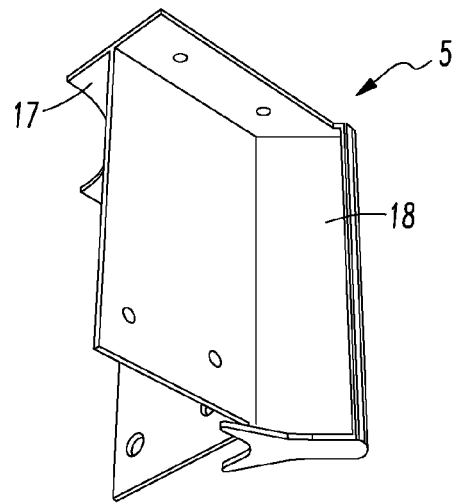
FIG. 8 is a front perspective view of a present preferred embodiment of a top corner bracket of our bench and planter combination.
Figure 9:
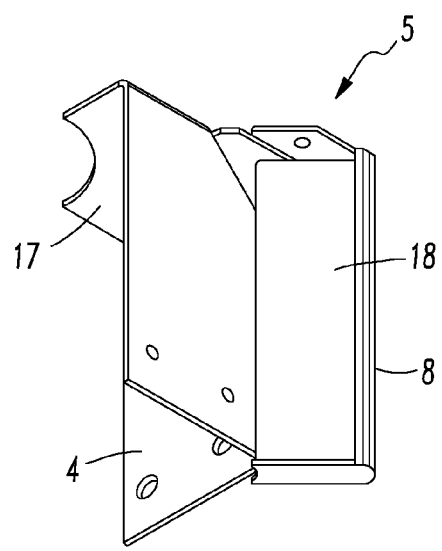
FIG. 9 is a front perspective view of a second present preferred embodiment of a top corner bracket of our bench and planter combination.
Figure 10:
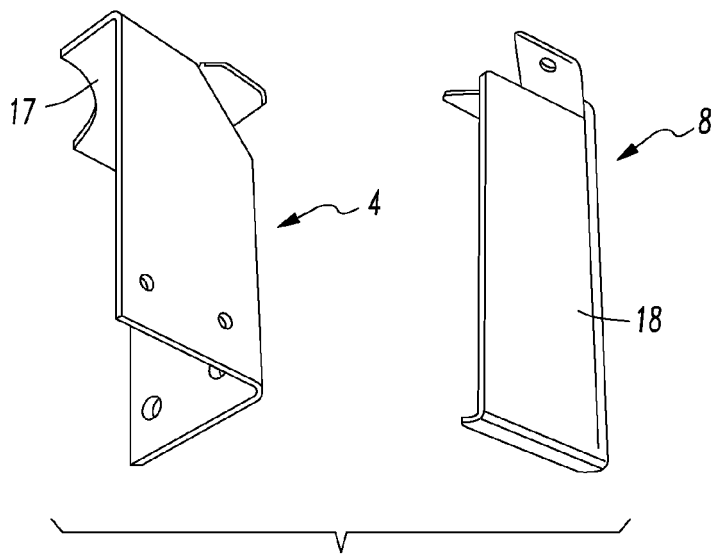
FIG. 10 is an exploded apart view of the embodiment of the top corner bracket shown in FIG. 9.
Figure 12:
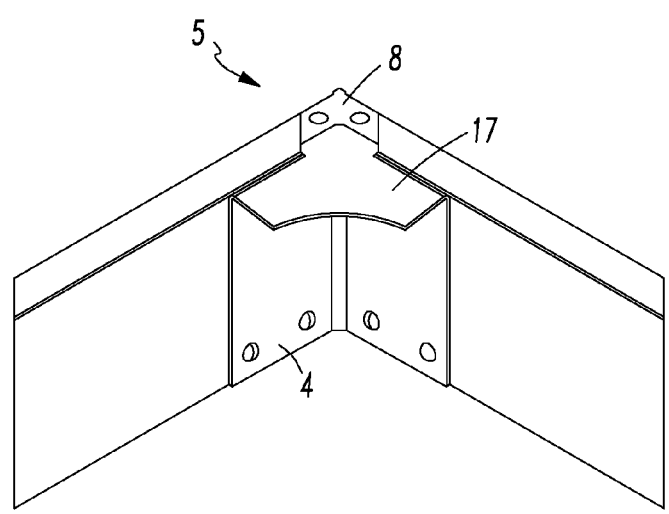
FIG. 12 is a perspective view of the assembled top corner bracket shown in FIG. 11.
Figure 13:
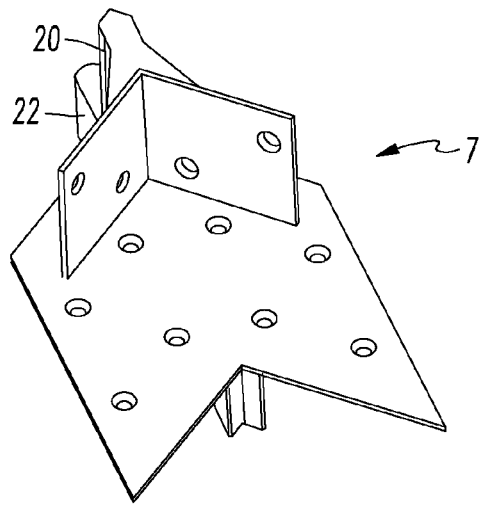
FIG. 13 is a front perspective view of a present preferred embodiment of a top frame corner bracket of our bench and planter combination.
Figure 14:
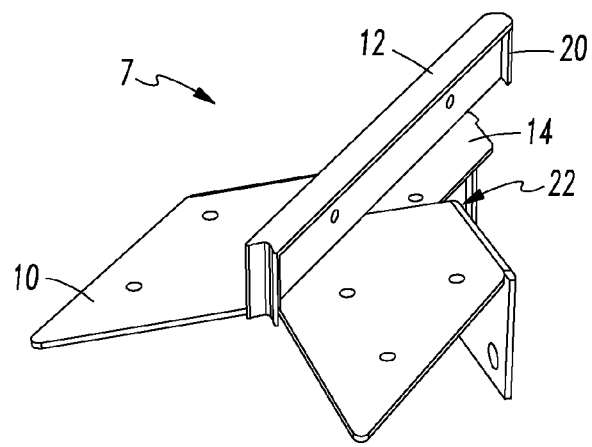
FIG. 14 is a front perspective view of a second present preferred embodiment of a top frame corner bracket of our bench and planter combination.
Figure 15:
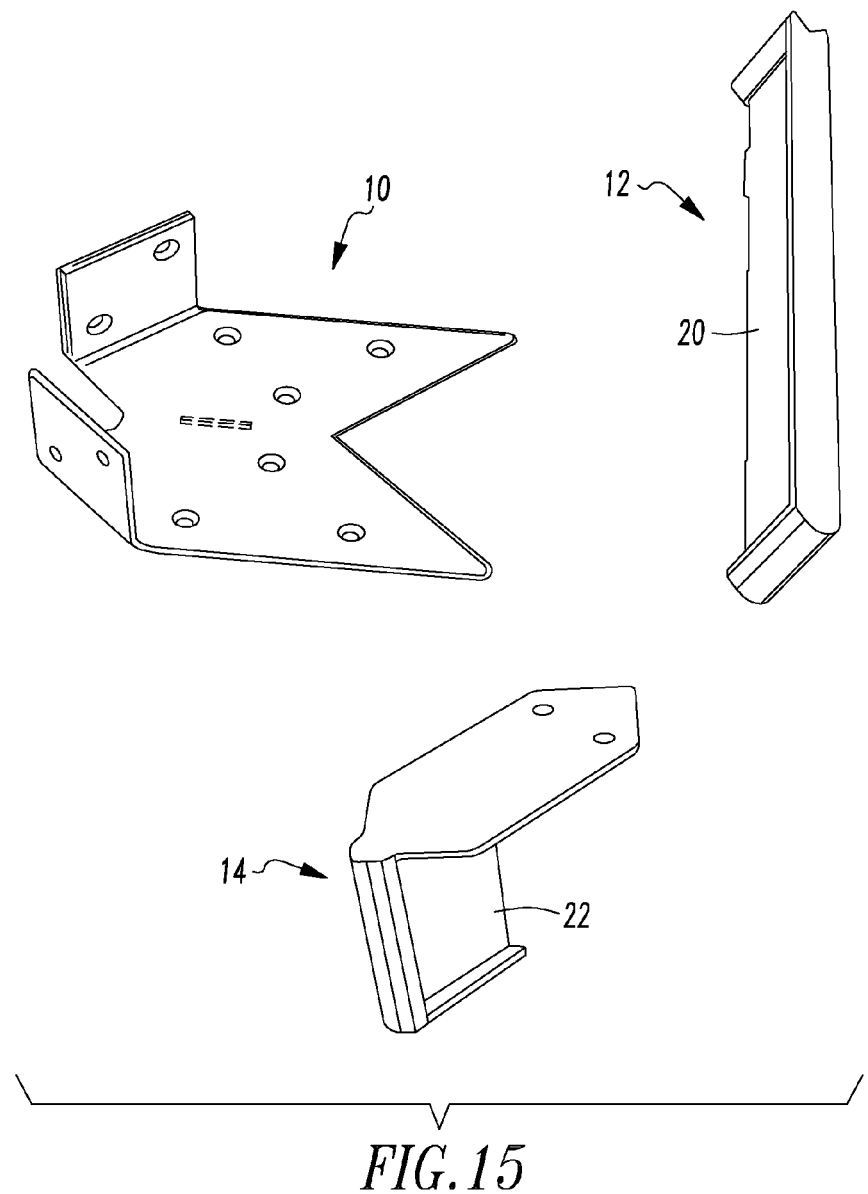
FIG. 15 is an exploded view of the embodiment of the top corner bracket shown in FIG. 14.

In embodiments illustrated in FIGS. 3, 8, and 13, the bottom corner brackets 3, the top corner brackets 5, and the top frame corner brackets 7 may each be a single piece that is a casting. In further embodiments illustrated in FIGS. 4-7 and 9-12 the bottom corner brackets 3 and the top corner brackets 5, respectively, may each comprise a first portion 2, 4 and a second portion 6, 8 such that the first portion 2, 4 or the second portion 6, 8 is a casting.

Similarly, as illustrated in FIGS. 14-17 the top frame corner brackets 7 may each comprise a first portion 10, a second portion 12, and a third portion 14 such that any one of the first portion 10, the second portion 12, and the third portion 14 is a casting. The casting may be formed from any suitable material, such as metal, plastic, or fiberglass. Further the first portion 2, 4, 10 of each of the bottom corner brackets 3, the top corner brackets 5, and the top frame corner brackets 7 may be formed from sheet metal while the other portions may be a casting. In addition, each of the corner beads 9 may be an extrusion, such as an aluminum extrusion.

Further, in the embodiments shown in FIGS. 3-17 each of the bottom corner brackets 3, the top corner brackets 5, and the top frame corner brackets 7 each comprise at least one cover portion 16, 18, 20, 22 being sized and configured such that a cut end of a board that is placed adjacent to the at least one cover portion is hidden from outward view by the at least one cover portion 16, 18, 20, 22. The at least one cover portion 16, 18, 20, 22 may be formed as a casting.

In another embodiment the kit may include a second selected number of brackets and components to form a second planter body along with a second planter tub. A kit that includes the components for two planters may also include the components for a bench substructure 31 shown in FIGS. 18 and 19. Furthermore, a kit for the bench substructure 31 may also provided separately.

As shown in FIGS. 18-21, a kit may include a pair of end plates 25, a pair of front corner bead supports 27, and at least one a pair of mounting brackets 29. The mounting brackets 29 are sized and configured to attach to sidewall of a first planter body 33 and a side wall of a second planter body 35. The front corner bead supports 27 are configured to attach to the end plates 25 to form a first bench substructure 31 and the end plates 25 are configured to engage the at least one pair of mounting brackets 29 when the at least one pair of mounting brackets 29 are attached to the first planter body 33 and the second planter body 35. This assembly allows the first bench substructure 31 to be supported on either end by the first planter body 33 and the second planter body 35. Further, the mounting brackets 29 may be secured to the corner bead 9 for additional support.

A kit that includes components for the bench substructure 31 may also include at least one pair of corner braces 37 and a bench center bracket 39 such that each of the at least one pair of corner braces 37 is attached at one end of each of the front corner bead supports 27 and is also attached to the end plate 25 that is attached to those ends of the front corner bead supports 27. The front corner bead supports 27 may be an extrusion, for example they may be an aluminum extrusion. The front corner bead supports 27 may also comprise a longitudinal ridge 41 such that the longitudinal ridge 41 of each corner bead support 27 supports an end of a plurality of boards 71 that are laid side by side. The front corner bead supports 27 may also have an outside surface that has a cavity 45 defined therein such that a board 73 may fit longitudinally within the cavity 45.

Figure 2:
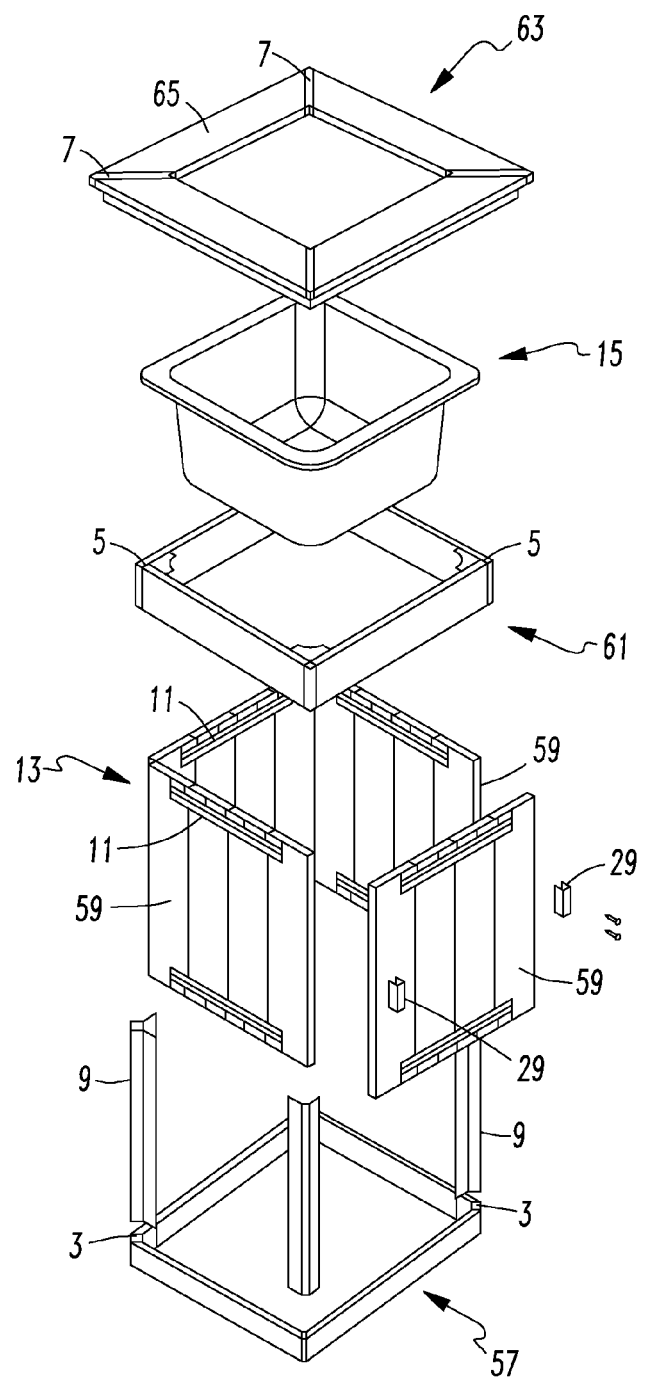
FIG. 2 is an exploded view of the planter body shown in FIG. 1.
Figure 4:
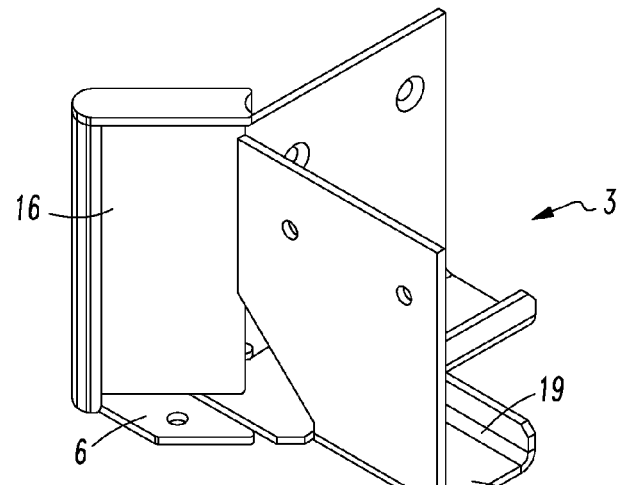
FIG. 4 is a front perspective view of a second present preferred embodiment of a bottom corner bracket of our bench and planter combination.
Figure 5:
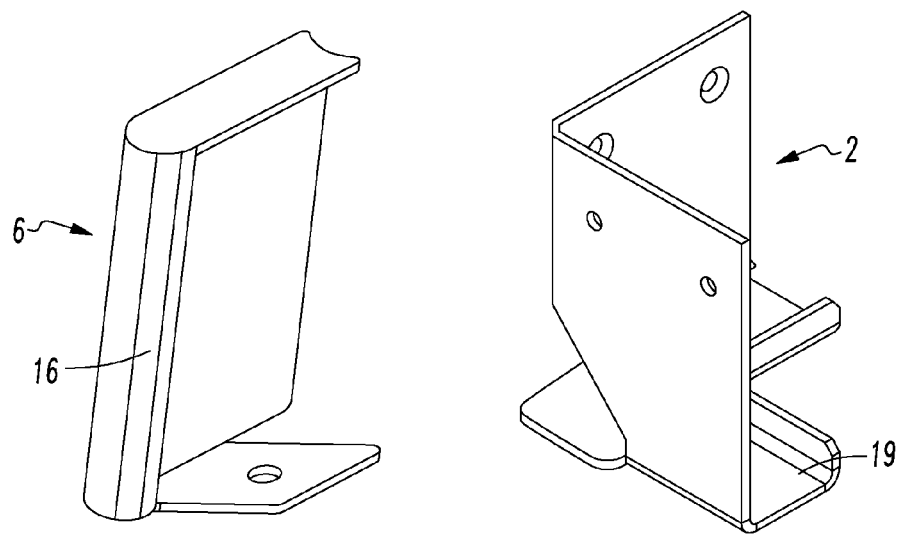
FIG. 5 is an exploded view of the embodiment of the bottom corner bracket shown in FIG. 4.
Figure 18:
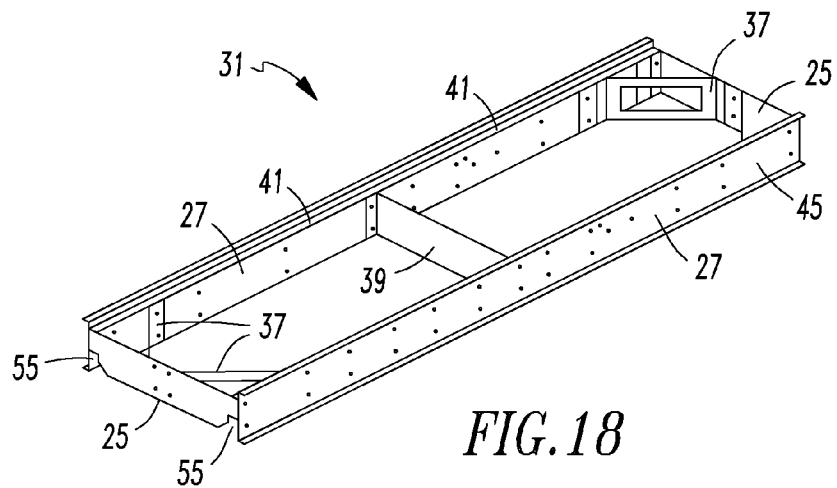
FIG. 18 is a front perspective view of a bench substructure of our bench and planter combination.
Figure 19:
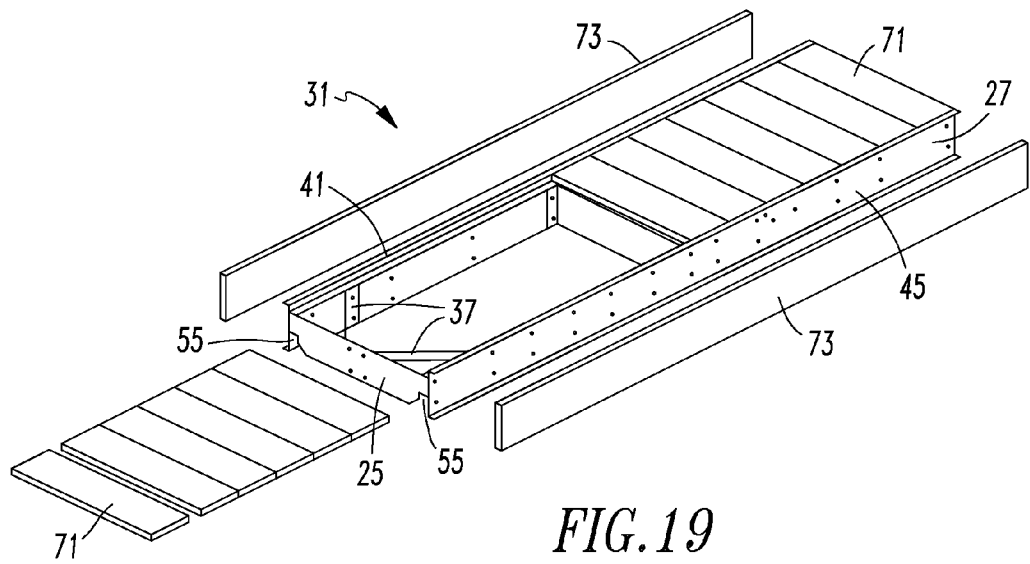
FIG. 19 is a perspective view of a partially assembled bench of our bench and planter combination as shown in FIG. 18.
Figure 20:
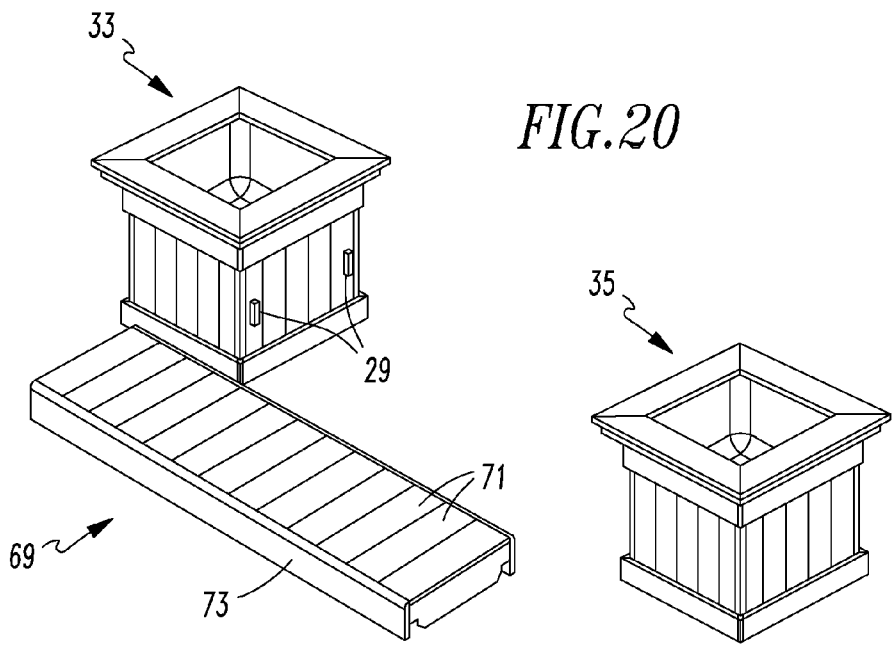
FIG. 20 is a perspective view of the components of a present preferred embodiment of our bench and planter combination, two planter bodies and a bench.
Figure 21:
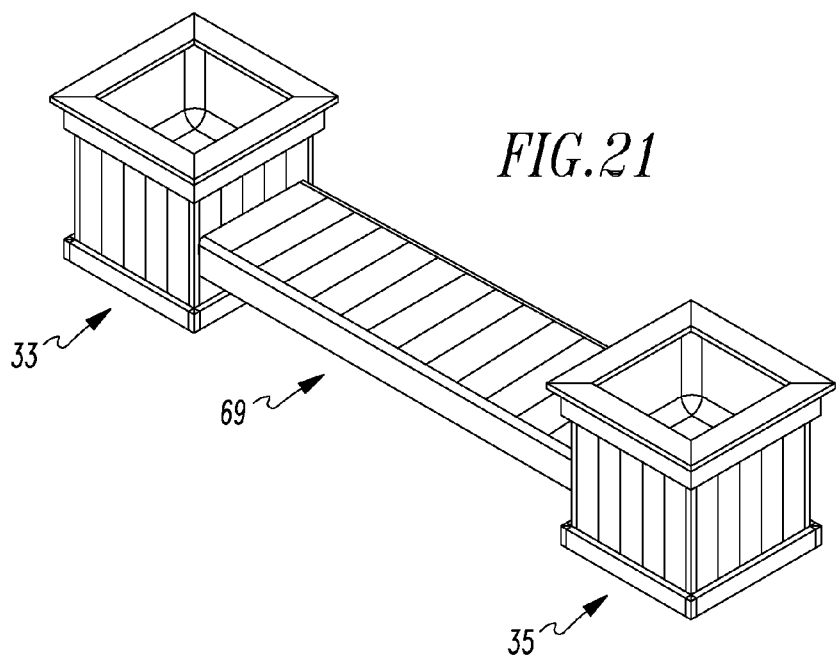
FIG. 21 is a perspective view of the present preferred embodiment of our bench and planter combination as shown in FIG. 20 that is fully assembled.

The mounting brackets 29 may be any number of mounting brackets 29 that can effectively hold the bench substructure 31 such that it bears a desired amount of weight. As shown in FIGS. 2 and 20 the mounting brackets 29 comprise a pair of mounting brackets 29 for each planter 33, 35. Further, as shown in FIGS. 18 and 19, the end plates 25 may have at least one notch 55. The least one notch 55 is configured to slideably engage the mounting brackets 29 when the mounting brackets 29 are attached to the first planter body 33 and the second planter body 35.

While the mounting brackets 29 are shown in FIGS. 2 and 20 as a pair of mounting brackets 29 for each planter, the mounting brackets may comprise a pair of mounting brackets such that one of the pair of mounting brackets is attached to the first planter body and the other mounting bracket is attached to the second planter body.

Figure 23:
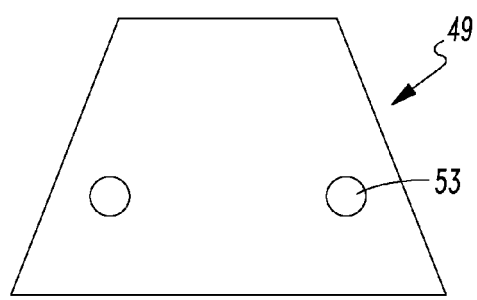
FIG. 23 is a front view of a preferred embodiment of a mounting bracket of our bench planter combination.
Figure 24:
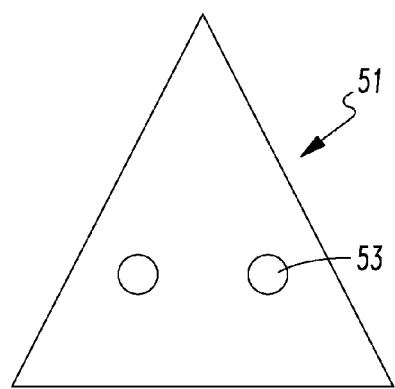
FIG. 24 is a front view of another preferred embodiment of a mounting bracket of our bench planter combination.

As shown in FIGS. 23 and 24, the mounting brackets 49, 51 may have a trapezoidal or triangular shape and the end plates of the bench substructure will have a corresponding shape or notch to allow the end plates to be slid over the mounting bracket and engage the mounting brackets 49, 51. Fastener holes 53 are shown in the mounting brackets 49, 51. The number and size of the fasteners holes 53 corresponds to an appropriate number of fasteners that will allow the bench substructure to bear a desirable amount of weight. Further, one of ordinary skill would recognize that other shapes and numbers of mounting brackets are possible.

In another embodiment, the kit may include a third selected number brackets and components to form a third planter body along with a third planter tub. The kit may also include the components for a second bench substructure. With that kit, an embodiment of the bench and planter combination may have three planters and two benches arranged in a straight line or in an L-shape. Furthermore, one of ordinary skill would recognize that a kit may include a number brackets and components to form a desired number of planters and benches that may be arranged in a number of different patterns. One of ordinary skill would also recognize that the bench and planter combination could be itself formed as a polygon with a desired number of sides.

Figure 6:
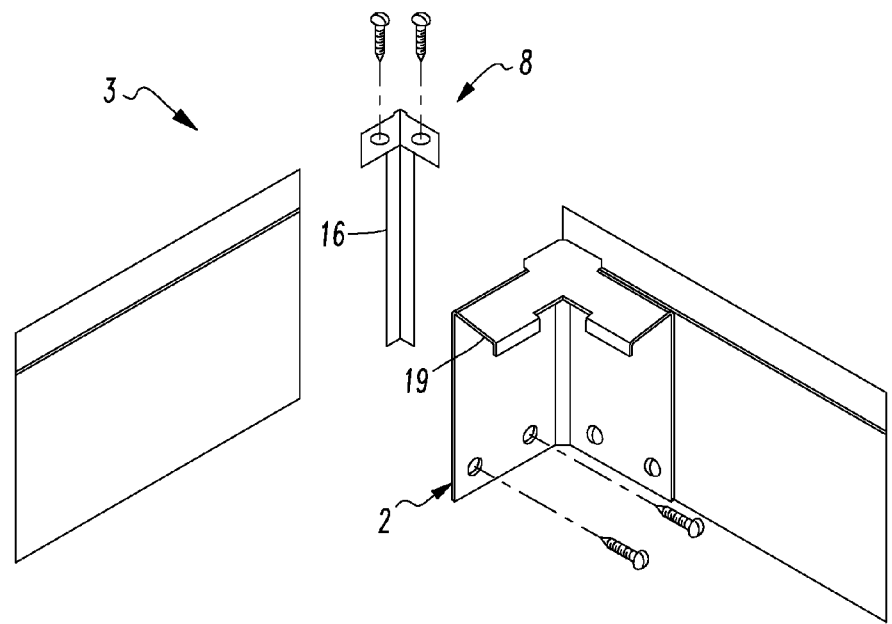
FIG. 6 is a perspective view of the bottom corner bracket shown in FIG. 4 as it is being attached to a pair of boards used during construction of a planter body.

The process for constructing a preferred embodiment of the bench planter combination where the planter 1 has four sides as shown in FIGS. 1, 2, and 20-22 is described below. The bottom ring 57 is formed using the bottom corner brackets 3. Boards are cut for the bottom ring 57 and those boards are miter cut to fit the bottom corner brackets 3. The bottom corner brackets 3 are installed as shown in FIGS. 6 and 7 on the ends of the boards. The boards and bottom corner brackets 3 are fastened together as shown in FIGS. 6 and 7 to form the bottom ring 57.

Boards are then cut to length for the sidewalls 59 of the planter 1. The sidewalls 59 are formed using the spacing runners 11 on the opposing ends of these boards. The spacer runners 11 can be attached by placing four boards flat and tight together so that a top and a bottom spacer runner 11 can be fastened into place. This is repeated to create four planter sidewalls 59. The sidewalls 59 are then fastened to the bottom ring 57. The corner beads 9 are fastened into corners of bottom ring 57 and the four planter sidewalls 59 are then slid into the tracks of the corner beads 9 and the sidewalls 59 are each fastened to the corner beads 9.

Figure 11:
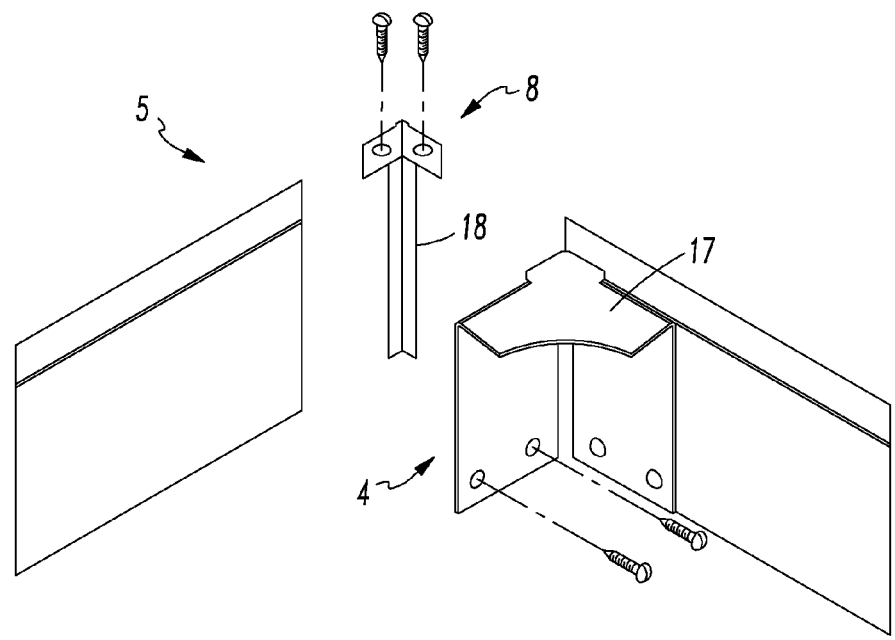
FIG. 11 is a perspective view of the top corner bracket shown in FIG. 9 as it is being attached to a pair of boards during construction of a planter body.

A top ring 61 is formed using the top corner brackets 5. Four boards are miter cut for the top ring 61 and the top corner brackets 5 are installed as shown in FIGS. 11 and 12 on the ends of the each of the boards. The top corner brackets 5 and boards are then connected as shown in FIGS. 11 and 12 to form the top ring 61. The top ring 61 can be placed onto the sidewalls 59 that have been placed into the bottom ring 57. The top ring 61 is then attached to the sidewalls 59. The planter tub 15 is then attached to the top ring 61 with fasteners. Holes are then drilled in a sidewall 59 for the mounting brackets 29. The holes for the mounting brackets 29 may be drilled using holes in the corner beads 9 as a guide. The mounting brackets 29 are then fastened to the sidewall 59. In a preferred embodiment, the mounting brackets 29 may be secured to the corner bead 9 for additional support.

Figure 16:
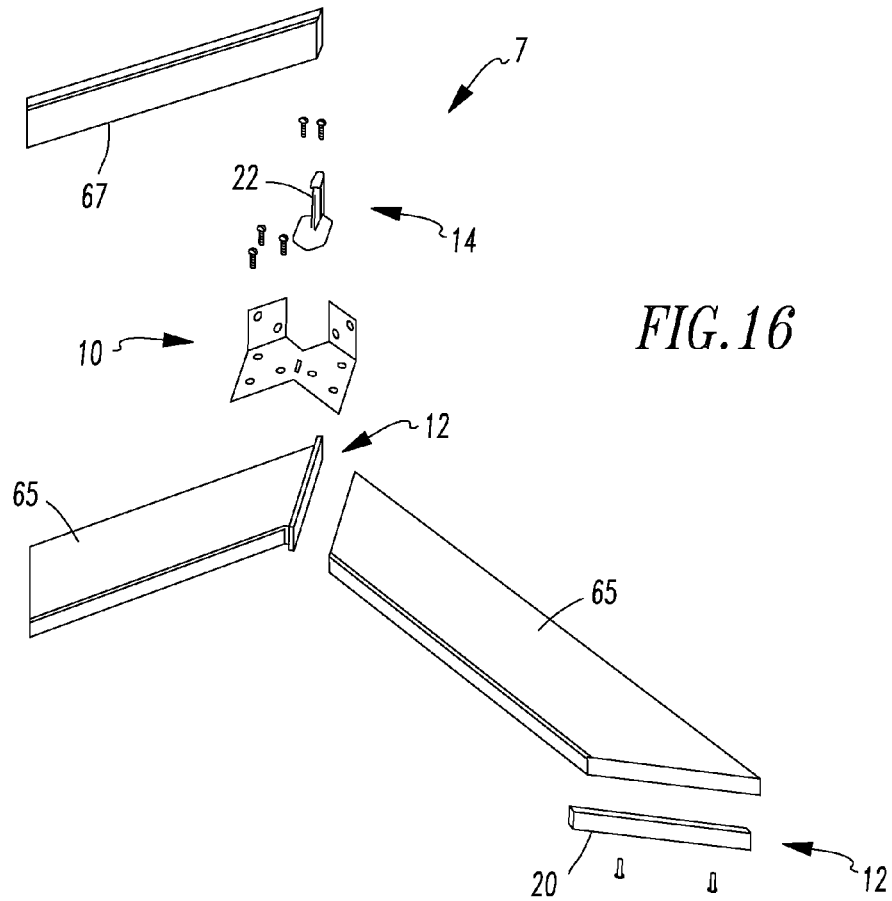
FIG. 16 is a perspective view of the top corner bracket shown in FIG. 14 as it is being attached to a pair of boards during construction of a planter body.
Figure 17:
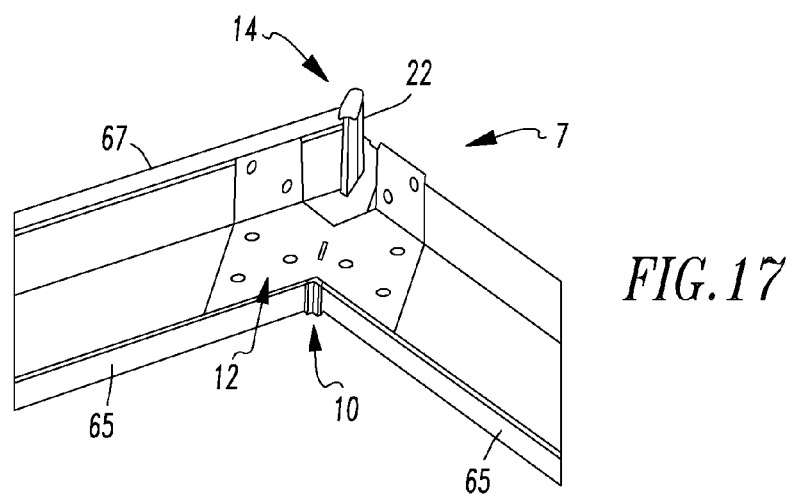
FIG. 17 is a perspective view of the assembled top corner bracket shown in FIG. 16.

The top frame 63 is made using the top frame corner brackets 7. Boards 65 are miter cut for the top frame 63 and the top frame corner brackets 7 are installed on the ends of those boards 65 as shown in FIGS. 16 and 17. Trim boards 67 are also cut and attached to the top frame corner brackets 7 as shown in FIGS. 16 and 17 to complete the top frame 63. The top frame 63 is then placed over top ring 61 of the planter body 13 to form the planter 1.

As shown in FIGS. 18-20, the bench 69 is formed by cutting boards 71 for the top of the bench 69 and cutting boards 73 for the sides or faces of the bench. The front corner bead supports 27 are fastened to one end plate 25. The boards 71 cut for the top of the bench 69 are then loaded side by side into the tracks formed by the longitudinal ridges 41 on the front corner bead supports 27. The boards 71 are loaded as shown in FIG. 19 such that they are held in place by the one end plate 25 that forms the closed end 75 of the bench substructure 31. Once enough boards 71 are loaded through the open end of the bench substructure 31, the other end plate 25 is fastened to the front corner bead supports 27 and the boards 71 on the top of the bench 69 are held securely in place.

Boards 73 are then placed into the cavities 45 on the outside surfaces of the front corner bead supports 27 and are fastened in place. The corner braces 37 and the bench center bracket 39 may then be fastened into place. The notches 55 in the end plates 25 are then placed over the mounting brackets 29 on the two planters 33, 35 and the bench 69 is slid downward over the mounting brackets 29 until the end plates 25 and mounting brackets 29 are fully engaged.

While I have shown and described certain present preferred embodiments of our bench and planter combination and have illustrated certain present preferred methods of making and using the same, it is to be distinctly understood that the invention is not limited thereto but may be otherwise variously embodied and practiced within the scope of the following claims.

I claim:

1. A kit for a planter having a polygon shape having a selected number of sides and a same selected number of corners comprising:
    a selected number of bottom corner brackets corresponding to the selected number of corners, the bottom corner brackets configured to receive an end of each of a pair of boards;
    a selected number of corner beads corresponding to the selected number of corners, the corner beads configured to receive a pair of adjacent boards;
    a selected number of top corner brackets corresponding to the selected number of corners, the top corner brackets configured to receive an end of each of a pair of boards;
    a selected number of top frame corner brackets corresponding to the selected number of corners, the top frame corner brackets configured to receive an end of each of a plurality of boards; and
    a selected number of pairs of spacer runners corresponding to the selected number of corners, each of the pairs of spacer runners configured to receive opposing ends of each of a plurality of boards; and
    wherein the bottom corner brackets, corner beads, top corner brackets, top frame corner brackets, and spacer runners are configured to be connected together to form a skeleton to which boards can be attached to form a first planter body; and
    a planter tub sized to fit within the first planter body.

2. The kit of claim 1 wherein the selected number of sides of the planter is three, four, five, six, seven, eight, nine, or ten.

3. The kit of claim 1 wherein each of the top frame corner brackets comprises a two tiered structure such that the top frame corner brackets are configured to receive an end of each of two pairs of boards, one pair of boards above and adjacent to the other.

4. The kit of claim 1 wherein each of the top corner brackets comprise a tub holding structure such that the tub holding structure supports a lip of the planter tub and engages a corner of the planter tub.

5. The kit of claim 1 wherein each of the bottom corner brackets comprise a base structure such that the base structure engages one corner bead and a pair of boards engaged with that corner bead.

6. The kit of claim 1 wherein the bottom corner brackets, the top corner brackets, and the top frame corner brackets are each a casting, wherein the casting is formed from metal, plastic, or fiberglass.

7. The kit of claim 1 wherein the bottom corner brackets and the top corner brackets each comprise a first portion and a second portion, and wherein the first portion or the second portion is a casting, and wherein each of the top frame corner brackets comprise a first portion, a second portion, and a third portion, and wherein the first portion, the second portion, or the third portion of each of the top frame corner brackets is a casting.

8. The kit of claim 1 wherein the bottom corner brackets and the top corner brackets each comprise a first portion and a second portion, wherein the first portion is formed by sheet metal and the second portion is formed by a casting and wherein the top frame corner brackets each comprise a first portion, a second portion, and a third portion, and wherein the first portion of each of the top frame corner brackets is formed by sheet metal and at least one of the second portion and the third portion of each of the top frame corner brackets is formed by a casting.

9. The kit of claim 1 wherein the bottom corner brackets, the top corner brackets, and the top frame corner brackets each comprise at least one cover portion being sized and configured such that a cut end of a board that is placed adjacent to the at least one cover portion is hidden from outward view by the at least one cover portion.

10. The kit of claim 9 wherein the at least one cover portion is formed from a casting.

11. The kit of claim 1 wherein each of the corner beads is an extrusion.

12. The kit of claim 1 further comprising:
    a second selected number of bottom corner brackets corresponding to a second selected number of corners, the second selected number of bottom corner brackets configured to receive an end of each of a pair of boards;
    a second selected number of corner beads corresponding to the second selected number of corners, the second selected number of corner beads configured to receive a pair of adjacent boards;
    a second selected number of top corner brackets corresponding to the second selected number of corners, the second selected number of top corner brackets configured to receive an end of each of a pair of boards;
    a second elected number of top frame corner brackets corresponding to the selected number of corners, the second elected number of top frame corner brackets configured to receive an end of each of a pair of boards; and
    a second selected number of pairs of spacer runners corresponding to the selected number of corners, the second selected number of pairs of spacer runners configured to receive an end of each of a plurality of boards; and
    wherein the second selected number of bottom corner brackets, second selected number of corner beads, second selected number of top corner brackets, second selected number of top frame corner brackets, and second selected number of pairs of spacer runners are configured to be connected together to form a second skeleton to which boards can be attached to form a second planter body; and a second planter tub sized to fit within the second planter body.

13. The kit of claim 12 further comprising:

a pair of end plates;

a pair of front corner bead supports; and at least one a pair of mounting brackets that is sized and configured to attach to the first planter body and the second planter body;

wherein the front corner bead supports attach to the end plates to form a first bench substructure having two ends; and wherein the end plates are configured to engage the at least one pair of mounting brackets when the at least one pair of mounting brackets are attached to the first planter body and the second planter body such that the first bench substructure is supported on one end by the first planter body and on the other end by the second planter body.

14. The kit of claim 13 further comprising at least one pair of corner braces and a bench center bracket, wherein each of the at least one pair of corner braces is attached at an end of each the front corner bead supports and is also attached to the end plate that is attached to those ends of the front corner bead supports.

15. The kit of claim 13 wherein the front corner bead supports are each an aluminum extrusion.

16. The kit of claim 13 wherein each of the front corner bead supports comprise a longitudinal ridge such that the longitudinal ridge of each corner bead support supports an end of a plurality of boards that are laid side by side.

17. The kit of claim 13 wherein each of the pair of front corner bead supports has an outside surface having a longitudinal cavity defined therein such that a board may fit within the longitudinal cavity.

18. The kit of claim 13 wherein the at least one pair of mounting brackets comprises a pair of mounting brackets, wherein one of the pair of mounting brackets is attached to the first planter body and the other mounting bracket is attached to the second planter body.

19. The kit of claim 13 wherein the end plates comprise at least one notch and the at least one notch is configured to slideably engage the at least one pair of mounting brackets when the at least one pair of mounting brackets are attached to the first planter body and the second planter body.

20. The kit of claim 13 further comprising:

a third selected number of bottom corner brackets corresponding to the selected number of corners, the third selected number of bottom corner brackets configured to receive an end of each of a pair of boards;

a third selected number of corner beads corresponding to the selected number of corners, the third selected number of corner beads configured to receive a pair of adjacent boards;

a third selected number of top corner brackets corresponding to the selected number of corners, the third selected number of top corner brackets configured to receive an end of each of a pair of boards;

a third selected number of top frame corner brackets corresponding to the selected number of corners, the third selected number of top frame corner brackets configured to receive an end of each of a plurality of boards; and a third selected number of pairs of spacer runners corresponding to the selected number of corners, the third selected number of pairs of spacer runners configured to receive an end of each of a plurality of boards;

wherein the third selected number of bottom corner brackets, corner beads, top corner brackets, top frame corner brackets, and pairs of spacer runners are configured to be connected together to form a skeleton to which boards can be attached to form a third planter body;

a second planter tub sized to fit within the third planter body;

a second pair of end plates;

a second pair of front corner bead supports;

at least one second pair of mounting brackets that are sized and configured to attach to the second planter body and the third planter body; and wherein each of the second pair of front corner bead supports attach to each of the second pair end plates to form a second bench substructure having two ends; and wherein each of the second pair of end plates are configured to engage the at least one second pair of mounting brackets when the at least one second pair of mounting brackets are attached to the second planter body and the third planter body such that the second bench substructure is supported on one end by the second planter body and on the other end by the third planter body.

* * * * *